A. H. ANDERSON.
AGRICULTURAL IMPLEMENT.
APPLICATION FILED SEPT. 14, 1918.
1,401,949.
Patented Jan. 3, 1922.
6 SHEETS—SHEET 5.
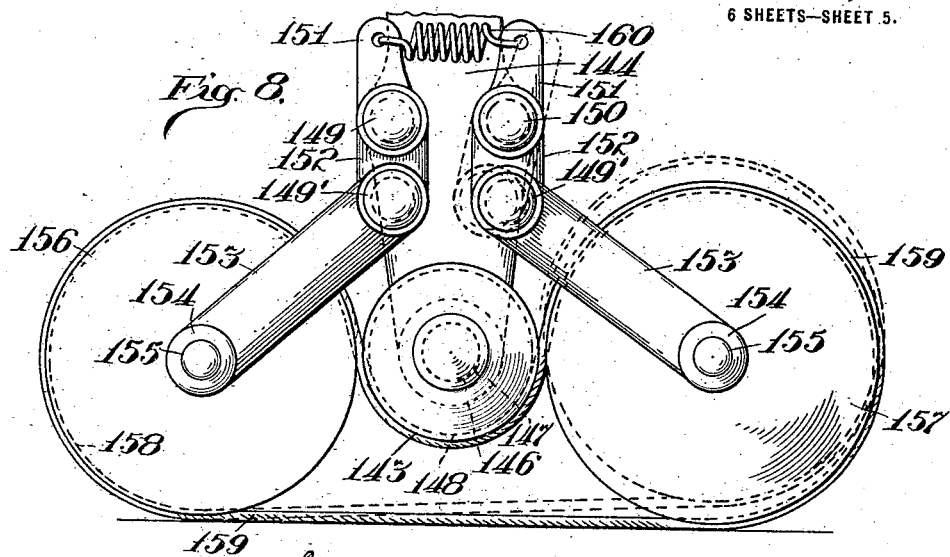
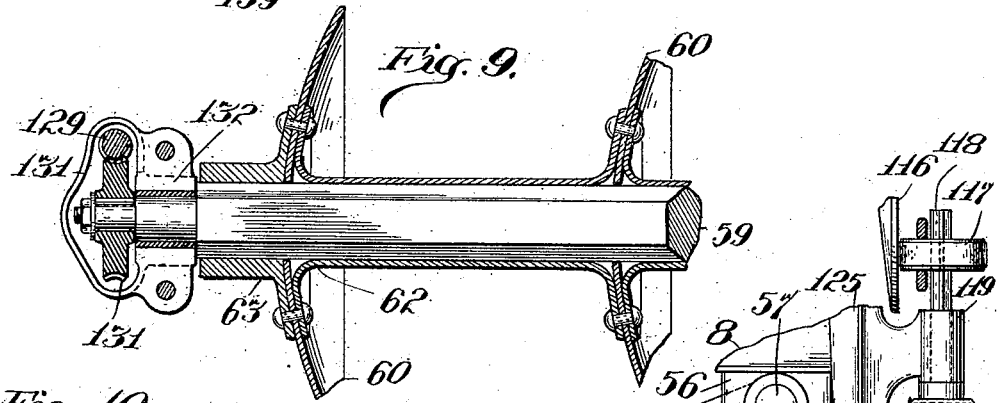
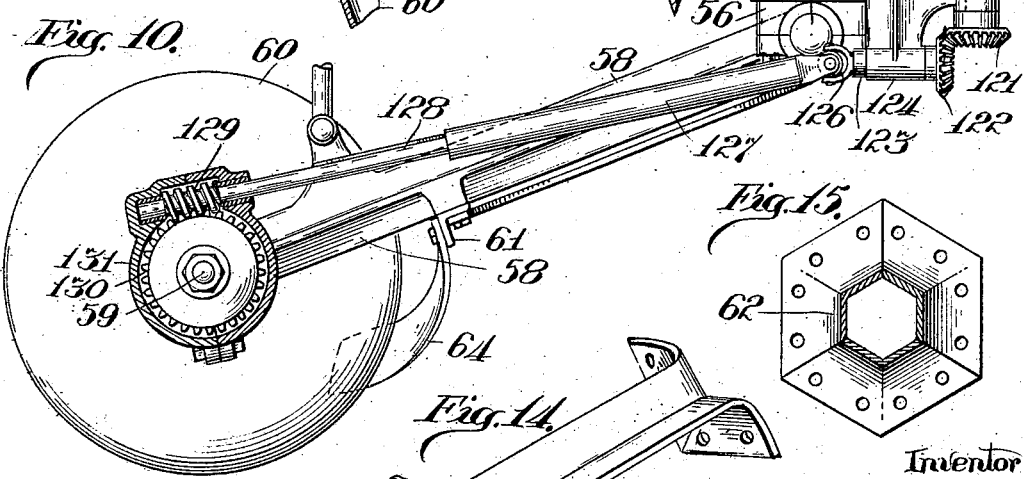
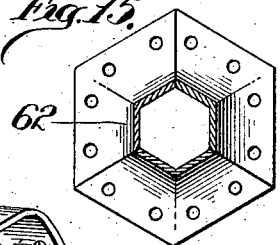
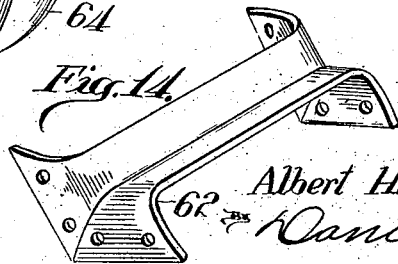
Inventor
Albert Hindley Anderson.
Daniel A Brennan
Attorney.

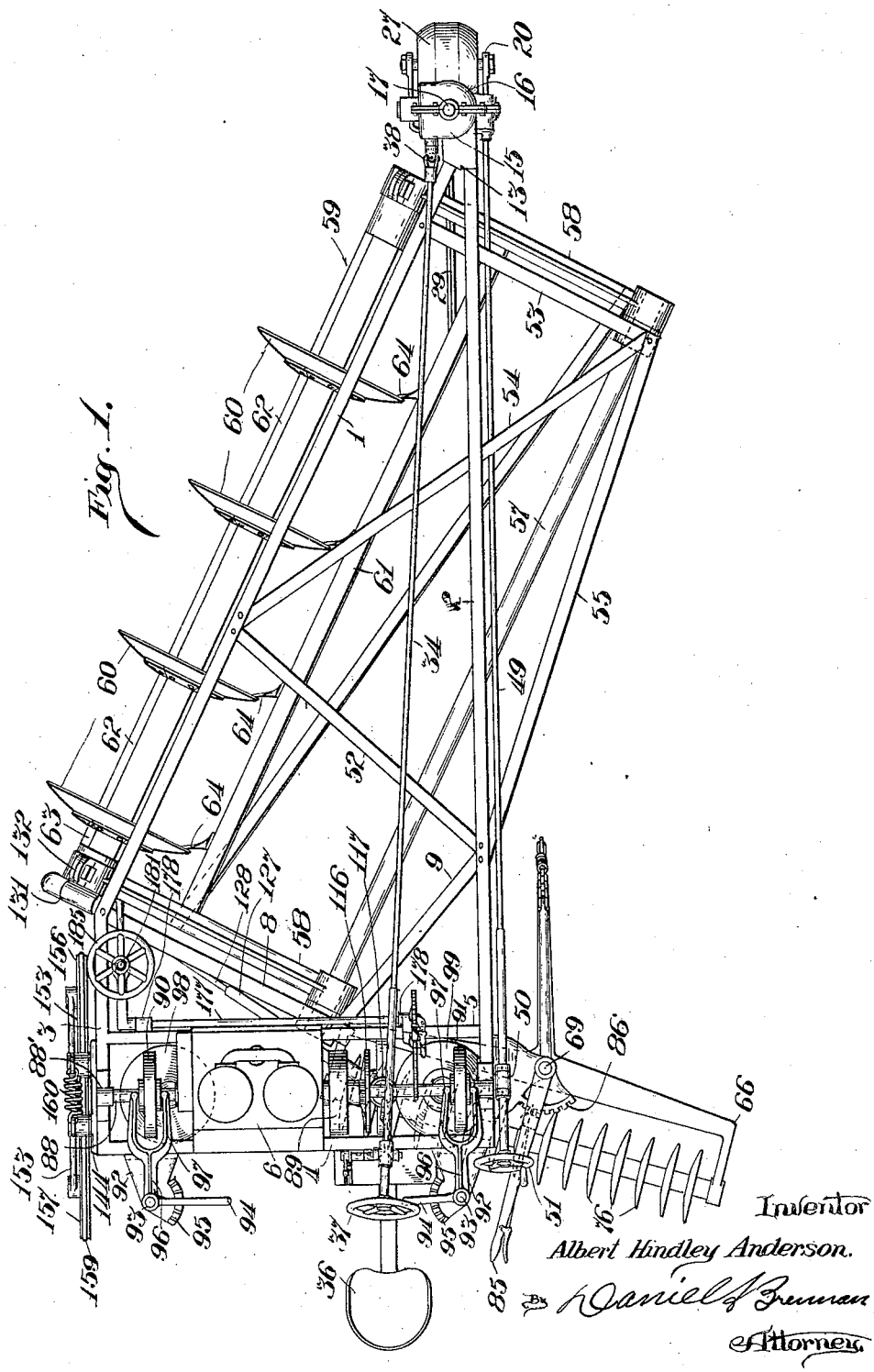

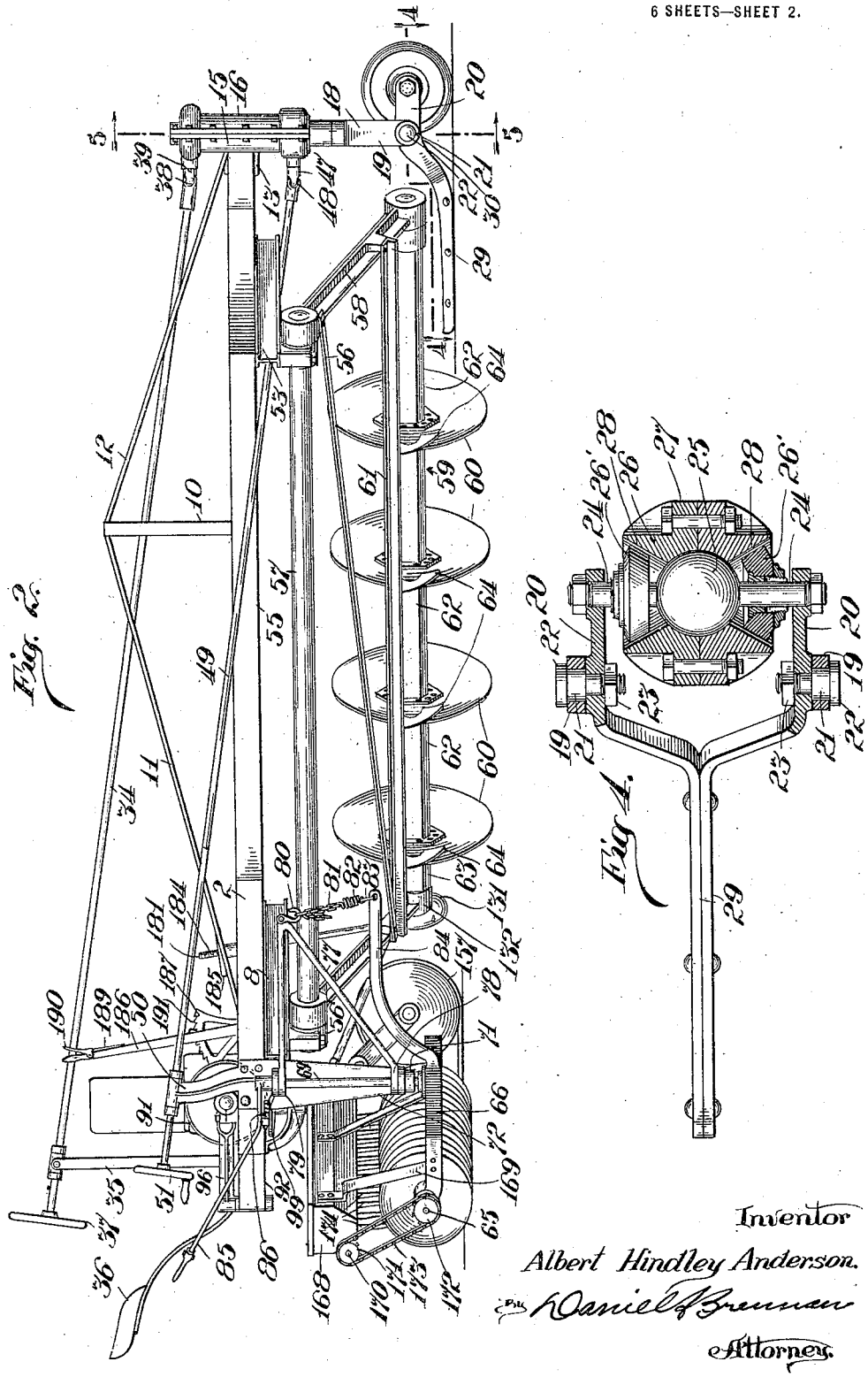

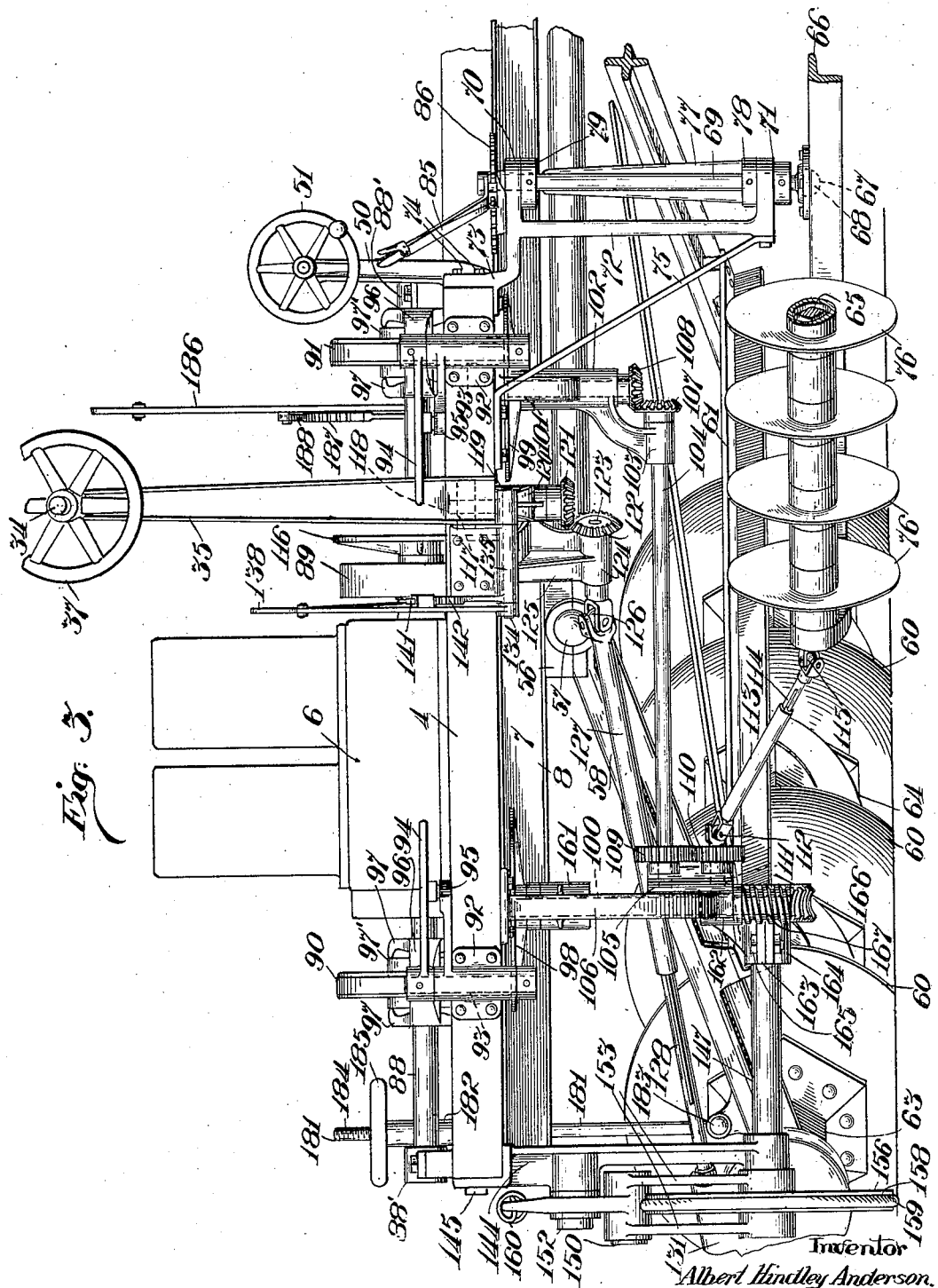

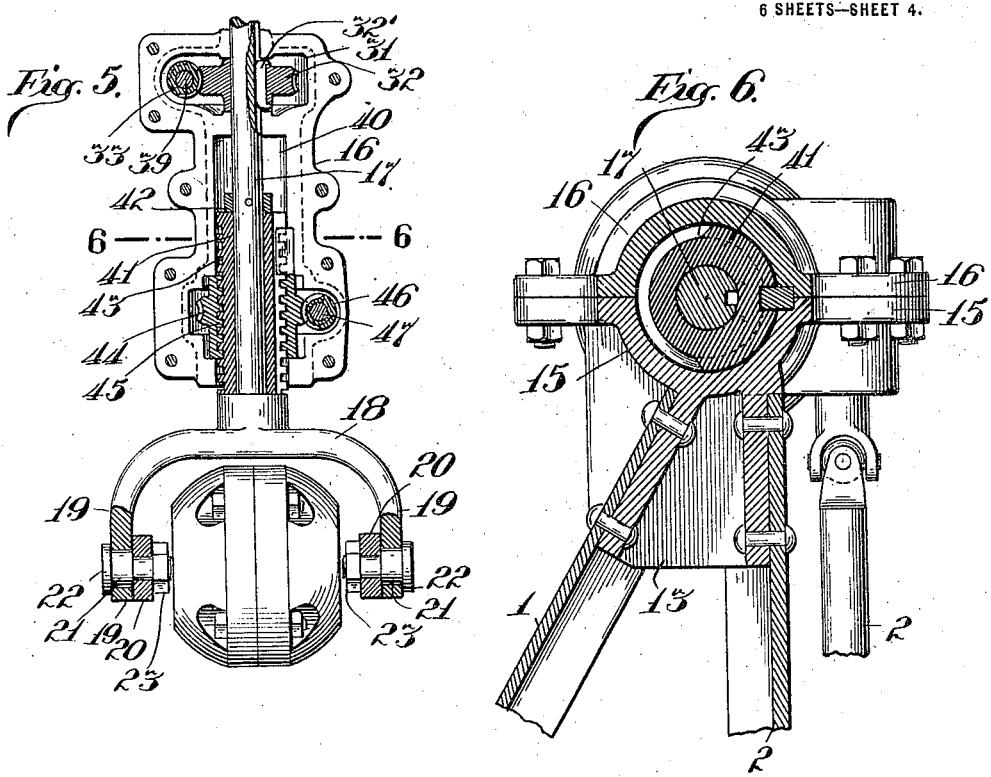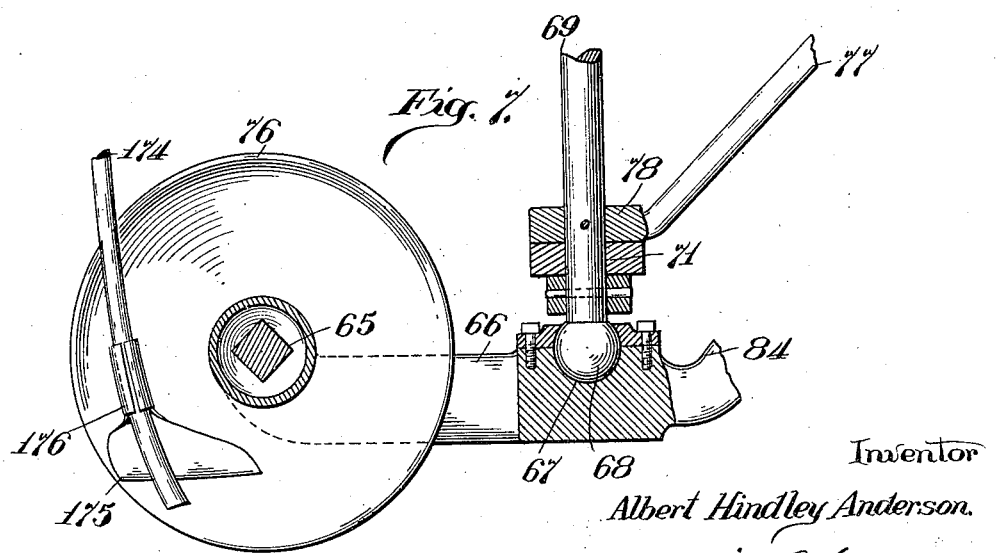

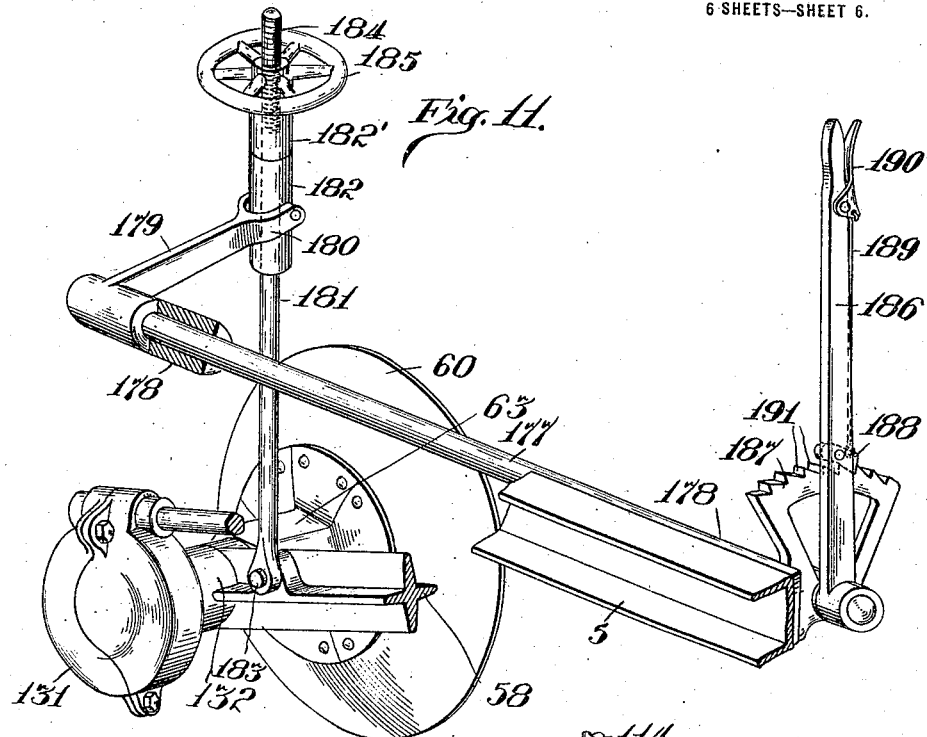
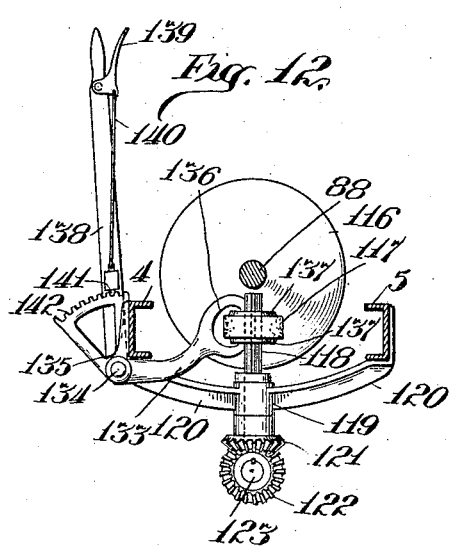
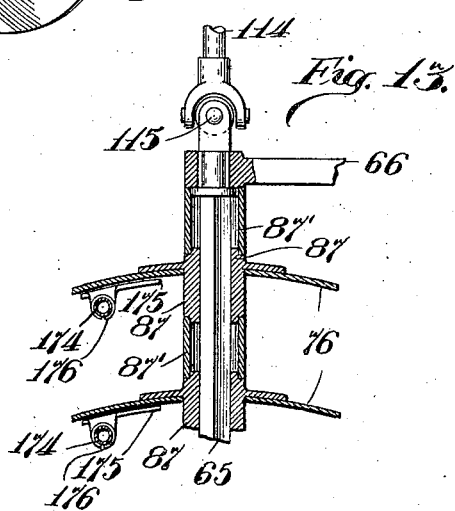
Inventor
Albert Hindley Anderson

UNITED STATES PATENT OFFICE.

ALBERT HINDLEY ANDERSON, OF HAMMOND, INDIANA.

AGRICULTURAL IMPLEMENT.

1,401,949. Specification of Letters Patent. Patented Jan. 3, 1922.

Application filed September 14, 1918. Serial No. 254,109.

*To all whom it may concern:*

Be it known that I, ALBERT HINDLEY ANDERSON, a citizen of Canada, residing at Hammond, county of Lake and State of Indiana, have invented new and useful Improvements in Agricultural Implements, of which the following is a specification.

This invention has relation to improvements in agricultural implements and more particularly pertains to the self propelled type of tractor plows and harrows, and the principal object is to provide an implement which will draw easily and obviate the frictional contact of the elements with the earth, to produce the plowing operation.

A further object is to provide an agricultural implement which will completely cultivate the earth and plant seed at one operation.

A further object is to provide an implement wherein the stress is equalized and the strain on the mechanism is reduced to a minimum.

A further object is to provide a self propelled implement in which the side draft of the machine is minimized.

A further object is to operate the propulsion mechanism by means of the direct drive of a single main shaft and to produce a combined tractor, gang plow, gang harrow and seeder, constructed as a unit and which may be operated and controlled in the manner of the ordinary hauling tractor.

A further object is to provide an agricultural implement which may be adjusted to overcome obstructions or depressions encountered in its line of travel.

A further object is to provide a machine, which may be readily used for grading or road work, and in which the mechanisms are operable at variable speeds.

To the accomplishment of the foregoing and related ends the invention consists of the means hereinafter fully described and particularly pointed out in the claims, the annexed drawings and the following description setting forth in detail certain arrangements embodying the invention which, however, constitute but one of the various ways in which the principle of the invention may be used.

In the annexed drawings:

Fig. 1 is a top plan view of the entire device, certain parts being omitted.

Fig. 2 is a side elevation of the implement.

Fig. 3 is a rear view of the same with parts omitted.

Fig. 4 is a horizontal section through the front supporting colter on line 4—4 of Fig. 2, but on a large scale.

Fig. 5 is a vertical sectional view through the shaft for the supporting element on line 5—5 of Fig. 2, also on a larger scale.

Fig. 6 is a horizontal sectional view on lines 6—6 of Fig. 5, showing the base on a larger scale.

Fig. 7 shows on a larger scale the connection between the frame of the disc gang and a vertical support thereof by means of a socket joint.

Fig. 8 is a side elevation of the tractor part of the implement.

Fig. 9 is a sectional view through a portion of the plow,

Fig. 10, is another sectional detail view, showing the drive for the same,

Fig. 11, is a detail perspective view of the plow gang adjusting mechanisms,

Fig. 12, is a detail side elevation of the plow gang operating mechanism.

Fig. 13 is a fragmental cross sectional view of the harrow discs, showing the combined scrapers and seeder associated with the harrow discs, and Figs. 14 and 15 are views of the hub elements.

Tractors in the general sense of the word are associated with that type of vehicles or machines, which merely haul gangs of plows, either moldboard or disc, and harrows, either pointed or disc and when used to haul the plow or harrow discs, are absolutely independent in function and operation therefrom, as the rotation of the discs, to perform their function, depends entirely upon their frictional contact with the earth.

In this particular device the actuating, plowing, harrowing and seeding mechanisms, are mounted for operation on the frame of the tractor.

The supporting frame of the implement is substantially triangular and comprises two sides 1 and 2 preferably made of I-beams, and arranged at an acute angle to each other, and a continuation of the rear portion of the beam 1 forms the beam 3, which extends substantially parallel to the beam 2 of the frame. The rear end of of the beams 2 and 3 are connected by parallel beams 4 and 5, which carry the platform for the engine 6 of the implement. As the principal strains upon the frame of the implement are exerted near the rear portion of the same, the beams 1 and 2 are interconnected by additional beams or braces 7 parallel to the beams 4 and 5, and by diagonal braces 8 and 9, as shown in Fig. 1 of the drawings. While the principal parts 1, 2, 3 of the frame as well as the braces 4, 5, 7, 8, and 9 are all located in substantially a single plane, additional braces reinforcing the structure against excessive strains in a vertical plane are shown in Fig. 2, where a post 10 is shown to rise from the beam 2 and braces 11 and 12 lead from the top of the post 10 towards the front and rear end of said beam respectively, where they are anchored with suitable brackets 13 and 14, which are rigidly secured to the top of the beam 2. This skeleton frame made up of structural iron or the like and serving as support for the engine 6, is carried by various combined soil tilling implements near the rear portion of the machine, while the front end or joint of the triangular skeleton frame is supported by a colter or steering wheel, by means of which the machine is steered and forming one of the three points of suspension and the same is operated and constructed as follows:

The bracket 13 near the front end of the frame is connected with a casing 15, which together with another casing 16 forms a bearing for a vertical shaft 17 (Fig. 5), and this shaft is connected at its lower end, which projects from the double casings, 15, 16, with a bifurcated portion 18. The prongs 19 of this bifurcated portion are sufficiently spaced from each other to receive between them the prongs 20 of another bifurcated member. The two prongs 19 and 20 are pivotally connected by pins 21, having at their projecting ends the head portions 22, while they are held against axial displacement in the registering openings of the bifurcated prongs 19 and 20 through nuts 23 or the like. The bifurcated ends 20 are continued forwardly from the pivotal connection 21 and carry near their forward or free ends the axles 24, which project from the bifurcated portions 20 inwardly and are connected at their inner ends by a sphere 25. This sphere or ball 25 serves as a support or bearing for the steering wheel or colter 26, being substantially of spherical shape, but being merged on its circumference in a flat cylindrical tread portion 27, the axis of which is substantially the axis of the two axle spindles 24. This spherical steering colter 26 has conical openings 28 at opposite sides into which the spindles 24 center. Conical rollers 26' are revolvably mounted on spindles 24 and have intermittent engagement with the conical walls of the openings 28 and permitting thereby the steering colter to turn not only in a horizontal plane but also in a vertical plane and thereby to roll practically unobstructed on the surface of the soil.

The rearward extensions of the prongs 20 are united, as indicated at 29, and this combined rearward extension of the prongs 20, projects rearwardly about two feet from the pivot bolts 21, which connect the bifurcated shaft 19 with the fork 20. The extension 29 acts as a shoe which is guided over the ground while the implement moves ahead, and the prongs 20 are curved near the part which is pierced by the bolt 21, as indicated in Fig. 2 at 30.

The shaft 17 carries in a suitable recess 31, in the combined casings 15 and 16 and near the upper end thereof, a worm gear 32, which is rigidly connected with the shaft 17 by means of a key 32' or the like and which is engaged by a worm 33 mounted near the front end of a rod 34, which extends rearwardly and is supported at the rear end of the machine by a bracket 35 adjacent to the seat 36 of the operator. The bracket 35 carries near its upper end a bearing in which the rod 34 is rotatably mounted, and the rod itself has a hand wheel 37 at the rear end. The front end, however, is connected by a universal joint 38 with a short shaft 39, terminating, as stated above, in the worm 33 which is located within the casings 15, 16 and which engages the worm 32 on the shaft 17. It is obvious therefore that through rotation of the handwheel 37, which rotation may be effected by the driver, the shaft 17 may be rotated about its axis, swinging thereby the fork 18 and therefore, also the ground engaging shoe 29, about the axis of the shaft 17 and effecting thereby the steering of the colter 26.

For the purpose of taking care of unevenness in the ground and to raise and lower the main frame of the machine through adjustment of the shaft 17, the casing formed by the casings 15, 16 is provided with a cylindrical recess 40, and through this recess the shaft 17 passes and carries a sleeve 41, which is held against axial displacement on the shaft by means of a collar 42 pinned to the shaft. This sleeve is provided on its circumference with a screw thread, as indicated at 43, and this thread is in engagement with the elongated hub of a worm gear 44, the bore of the hub being provided with an internal thread 45, engaging the external thread 43 of the sleeve 41. It is obvious therefore that upon rotation of the worm gear 44, an axial displacement of the shaft 17 will occur and that depending upon the direction of this axial displacement, the front end or suspension point of the entire machine will either be raised or lowered. The worm gear 32 in the upper portion of the casing 15, 16 engages a keyed groove of the shaft 17, by means of the key 32', permitting thereby axial displacement of the shaft 17 without rendering it impossible to cause rotation of said shaft by rotation of the gear 32. The rotation of the worm gear 44 is effected by a worm 46, which is mounted at the front end of a short shaft 47 entering the combined casing 15, 16 and carrying at its rear end a universal joint 48 in which said short shaft 47 is connected with the rod 49. This rod, as may be seen from Figs. 1, 2, and 6, extends to the rear of the machine within reach of the operator, the rear end of the rod being supported by bracket 50 on the platform of the engine, and this rear end also carries a hand wheel 51, whereby through the rotation of said rod 49, the shaft 17 may be raised and lowered in the combined casings 15 and 16.

By this construction it is obvious, that by providing means for elevating and lowering the tractor frame at this point of suspension, the machine is automatically adjusted to overcome obstructions or depressions encountered in its line of travel and likewise if the implement is to be used in road work, wherein grading is done, the frame may be elevated or lowered at this point to dispose the plowing elements at the proper angle for such work.

The implements which are incorporated in this machine comprise a plow in the form of a gang of rotary discs in which, however, the discs are rotated not by the advance of this particular class, but are driven positively, a disc harrow gang in which the drive of the discs is effected in a similar way, that is, without relying upon the advance of the implement and its frictional contact with the ground, and a seeder for automatically depositing through the agency of mechanical means, seeds in the furrows which are cut by the discs of the harrow. While the disc-plow is mounted adjacent the right rear end of the main frame of the machine, as seen from the rear, the rotary disc harrow and seeder are located underneath the left hand corner at the base of the triangular frame of the machine and comprise the second point suspension of the frame.

As may be seen from Figs. 1 and 2 the rotary plow is supported on an auxiliary frame substantially square or rectangular in shape and consisting of beams 52, 53 and 54, 55 which are secured to the main frame by rivets or the like. The rear beam 53 and front beam 8, of this frame is provided at its ends with brackets 56 in which rests a shaft 57, carrying at the ends projecting from the brackets 56, the arms 58, in the front ends of which a shaft 59 is mounted. As the arms 58 are pivotally supported on the shaft 57, it is obvious that the weight of the plow shaft 59, increased by the plow discs 60, will have a tendency to force the plow downwardly into the soil so as to effect the treatment of the soil in the desired way.

When the plow discs 60 are rotated at a higher rate of speed than that at which the implement is traveling the extra slippage will cause the plow discs to dig into the ground. The worm 129, positioned above and in meshing engagement with the worm gear 130, exerts a downward pressure on the plow discs, serving to cause the same to bite into the soil and in this connection, the weight of the machine likewise aids in the disc thrusting operation.

For the purpose of reinforcing this structure the arms 58 are connected midway between the shaft 57 and the shaft 59, by another additional transverse arm 61, as shown in Figs. 1 and 2. The attachment of the plow discs 60 to the shaft 59 may be effected in any approved or desirable way, as will be hereinafter set forth. The discs 60 are constructed of metal being of concavo convex conformation and are reinforced near their center by hexagonal hub elements 62 and 63, respectively, which are riveted to the opposite sides of the material comprising the discs 60. That portion of the shaft 59 on which the discs 60, are mounted is hexagonal, as seen in Fig. 9, and it is obvious therefore that upon placing hexagonal hubs 62, 63 upon said shaft and fastening the same to the discs 60 the discs will be positively rotated when the shaft 59 is rotated. The drive of these discs 60 and the pertaining shaft 59 will be described later. It is to be noted, however, that in connection with the discs 60, a plurality of scrapers 64 are secured at their upper ends to arm 61 and are closely adjacent to the periphery of the concave sides of the discs (Fig. 10).

The same arrangement is also provided for the combined disc harrow and seeder, which supports the left hand rear corner of the frame of the implement and which is arranged approximately at right angle to the axis of the disc plow gang and serves to counteract the thrust which is exerted by the disc plow gang upon the implement. The combined disc harrow and seeder is mounted on a shaft 65, which is supported at its ends in a yoke 66, having in its central portion a socket 67 for the reception of a ball 68 at the foot end of a rod 69. The rod is pivotally mounted in bearings 70 and 71 of a bracket 72, which latter is formed with an offset arm 73, by which it is secured by bolts 74, to the main frame. A continuation of offset arm 73 forms the bracket 50, supporting the rod 49. A brace 75, having one end bolted to the frame beam 4 and the other to the lower end of bracket 72, serves to further strengthen same. It is obvious that owing to the provision of the ball and socket joint, the yoke 66 and therefore also the entire gang of harrow discs 76, may be swung so as to bring the disc blades into diagonal line or tangent as may be required to give the proper amount of bite to the soil, and to counteract the side pull at the rear end of the implement.

For facilitating the adjustment of yoke 66, a triangular bracket 77, is mounted on the collars 78, and 79, and arranged for pivotal movement on the rod 69 and extends forwardly therefrom. The bracket 77 carries at its apex portion, a hook 80, which connects with a chain 81 and a tension spring 82, which latter is attached to a link 83, on an arm 84 of the yoke 66. The bracket 77 being pivotally mounted on rod 69, between the collars 78 and 79, is operated by means of a hand lever 85, rigidly secured to the collar 79 and rod 69, and when adjusted on the quadrant 86, causes the adjustment of the bracket on rod 69 and consequently the adjustment of the disc harrow unit.

By shortening or lengthening the chain connection 81, the entire gang of discs 76 may be forced upwardly or downwardly as may be desired. This adjusting feature will impart a certain degree of balance to the machine as a whole, as by raising or lowering the ball and socket joint (Fig. 7), it thereby tilts the front of the machine. The ball and socket union recited, forms an under-slung point of suspension of the tractor frame.

The positive drive of the harrow gang of discs 76 also will be described below in connection with the positive drive of the discs 60 of the plow unit. From Fig. 3 it will be apparent that the shaft 65 on which the discs 76 are mounted is square, so that upon rotation of said shaft the rotation is also imparted to the hubs 87, of the discs 76, these hubs being spaced from the adjacent discs by sleeves 87'.

The engine 6, of the ordinary gasoline propulsion type which, as has been stated above, is mounted on a platform arranged on the beam 4 and 5 of the machine frame, and drives an engine shaft 88, mounted in bearings 88' and carries in close proximity to the engine a fly-wheel 89 and near its ends friction discs 90 and 91 respectively, which are driven with the shaft, but are slidable longitudinally thereon, the discs 90 and 91 being provided with keys in splines of the shaft 88. Brackets 92 are secured to and disposed adjacent both ends of the beam member 4, and carry vertical stems 93 having handles 94, which are provided with pawls (not illustrated) moving over the locking quadrants 95, so that the stems 93 may be adjusted to any desired position. These stems are rigidly connected with yokes 96, having prongs 97 which act from opposite sides upon the hubs 97' of the discs 90 and 91 respectively, so as to displace said discs longitudinally on the main shaft 88 without, however, interrupting the drive of the discs. Both of the discs 90—91 are adapted to co-operate with the horizontal friction discs 98 and 99 respectively, which are mounted on top of vertical shafts 100 and 101 and to which rotation is imparted by frictional contact with the discs 90 and 91 on the engine shaft 88, the speed of rotation imparted to friction discs 98 and 99 and to the shafts 100—101 on which they are carried may be varied, and that, depending upon the place of engagement on the circumference of the disc 98 or 99, the direction of rotation of the latter discs, may be altered without causing an alteration of the driving discs 90 and 91. The disc 99 as before mentioned is carried at the top of a shaft 101, which in turn is mounted in a bracket 102, the latter being secured to the lower surface of beam 4, of the frame of the implement.

This bracket 102 is provided with an offset or bearing 103, which serves as a support for one end of a countershaft 104, the opposite end is journalled in a bearing offset 105 forming a part of a suspension bracket 106. This countershaft 104 carries at one end a bevel pinion 107, having meshing engagement with a bevel pinion 108, mounted on the lower end of the shaft 101, whereby upon the rotation of the driving disc 99 power is transmitted to the countershaft 104. This countershaft 104 carries at its opposite end a pinion 109. Upon rotation of the pinion 109, power is transmitted through the engagement of its teeth with the teeth of a pinion 110 mounted on stub shaft 111 in the bearing offset 105, and carries one section of a universal joint 112, the other section forming the end of a telescoping rod 113, supplemented by another rod 114, which by means of the universal joint 115 is connected to the shaft 65, carrying the gang of the discs 84. It is obvious therefore that by the transmission gearing including the driving discs 91—99, the bevel gears or pinions 108 and 107, the spur gear pinions 109 and 110 and the universal telescoping rod transmission 113—114, a positive drive is imparted to the disc harrow gang and that the speed of this drive may be altered entirely independently of the speed at which the other implements of the device of the tractor itself are being driven. The rotation of the discs 76 also may be altered together with the reversion of the main shaft 88 of the engine.

The drive of the plow discs 60 is effected by means of a friction disc 116 which, as shown in Figs. 3 and 12, is mounted on the main shaft 88 close to the fly-wheel 89 of the engine 6, and which with the latter is held against longitudinal displacement on the shaft 88 by a key or otherwise. This disc 116 is in frictional engagement with a wheel 117, slidably mounted on a vertical shaft 118 (Figs. 10 and 12), which is suitably supported in a bearing 119 in the bracket 120, mounted on the lower surface of the beam 4. The shaft 118 carries at its lower end a bevel gear 121 which has meshing engagement with another bevel gear 122, mounted at the front end of a short axle 123, supported in an offset arm 124 of the bracket 125. The short axle 123 carries on end a universal coupling 126, which is connected to the coupling end of a tube 127, forming one part of a telescoping shaft 128. The other end of said shaft 128 carries a worm 129, engaging a worm gear 130 on the shaft 59, on which the plow discs 60 are mounted as described above. The alteration of the friction wheel 117 on shaft 118, with respect to the friction disc 116, will cause an alteration in the speed with which the discs 60 of the plow are driven, so that the rotary speed of the plow again may be altered independently of the speed at which the engine operates, depending upon the location of the wheel 117 with respect to the face of the friction disc 116. It will also be noted that worm 129 acts from above upon the worm gear 130 of the plow shaft 59, tending to force disc plates downward and the outward thrust of the worm gear tends to counter-balance the inward pressure of the disc plow blades. The worm and worm gear 129 and 130 are disposed in a casing 131 which is mounted on the bearing 132 of the plow shaft 59, so that the variable speed can readily be altered and the positive drive or the direct engagement of the driving means with the driving worm 129 will always be maintained.

The speed of rotation of wheel 117, and consequently that of the plow discs 60, is regulated by adjusting the position of wheel 117, with relation to its position on the face of disc 116, and this function is accomplished by means of an adjusting arm 133, which is mounted on the pin shaft 134, which latter is revolvably mounted in a bearing offset 135. The adjusting arm 133, curves inwardly from its point of intersection with shaft 134, and its free end is bifurcated to form prongs 136. The wheel 117, is positioned between the said prongs 136 which engage the hubs 137 thereof, and upon adjustment of a lever 138, on the shaft 134, the said wheel 117 is moved in a vertical plane on shaft 118. The extent of adjustment of lever 138 and wheel 117 is regulated by a latch mechanism carried by said lever and which comprises a hand latch 139, pivotally mounted thereon and which is attached to the upper end of rod 140, carrying a latch bar 141, having engagement with the teeth of the segmental quadrant 142.

The propelling means for the tractor implement incorporating a self laying track, forms the third point of suspension therefore, and is an important improvement of the present invention, the said propelling device being particularly illustrated in Fig. 8 of the drawings and embodies a simplified transmission which is interposed between friction disc 98, driven by disc 90 and a pulley 143. An arm 144, secured to beam 3, of the main frame by bolts 145, extends downwardly at the right rear portion of the frame (Figs. 3 and 8), and has at its lower end a bearing 146, for the countershaft 147, which carries on the portion extending through the said bearing, the pulley 143, the latter being grooved at 148. This arm likewise is provided with pivot pins 149, 150 on which the arms 151, of bell crank levers 152 are mounted. The other arms 153 of the bell crank levers which likewise pivot on pins 149' on the lower ends of arms 151 carry at their free ends bearing collars 154, adapted to receive the pins 155. The arms 153 are bifurcated and tractor wheels 156 and 157 are disposed in the bifurcated portions of the arms and are mounted on the pins 155, which extend therethrough. These tractor wheels like the pulley 143, are provided with one or more circumferential grooves 158, in which cables or ropes 159 may be trained. While according to Fig. 8, the two wheels 156 and 157 are shown approximately the same size, it is obvious that the size need not be exactly the same and the two wheels may have different diameters. The rope or cable 159 is also trained under the grooved pulley 143 and it is obvious therefore, that if the rope or cable 159 is held under tension and if rotation is imparted to the pulley 143, this rotation will be transmitted through the flexible transmission member 159 to the traction or running wheels 156 and 157, and that portion of the transmission member 159, between the said wheels, will form a track which is in permanent engagement with the ground. The arms 151 of the bell crank levers are interconnected at their upper ends by a spring 160, having the function, that any oscillation of one of the bell crank levers, will gradually and yieldingly influence the position of the other bell crank lever, maintaining the transmission member 159, permanently taut and effecting the permanent drive of their running or carrying wheels 156—157. By this arrangement the running wheels 156—157 will be balanced and guided, and allowance is made for the stretching of the transmission cable 159. Should the tractor frame at this point be thrown upward, the arm 144 is likewise pulled uward and the wheels 156—157 will likewise be pulled upward and are kept from falling low enough to allow the cable 159, to slip off of the said wheels, The wheels 156—157 as before stated operated by the transmission cable 159 and pulley 143, derive their energy from the main drive shaft 88, in the following manner:

Disc 90 on the main drive shaft 88, has frictional engagement with disc 98 mounted on shaft 100 at its lower end of suspension bracket offset 161 and shaft 100 at its lower end has bearings on the offset 162 of said bracket 106. The countershaft 147 is likewise journalled adjacent one end in the split offset 163 of the suspension bracket 106 and a bearing plate 164 is coupled to the offset 163 by bolts 165 to afford bearing union for said shaft 147. This shaft carries at one end a worm gear 166, which has permanent meshing engagement within the worm 167 on shaft 100, while the opposite end as before stated carries the transmission pulley 143. It will thus be seen that power imparted to discs 90—98 will be in turn imparted to shaft 100, worm 167, worm gear 166, countershaft 147, and to the propulsion elements embodied in pulley 143 and wheels 156 and 157. Depending upon the adjustment of yoke 96, as affected by the handle 94, the drive of the entire implement over the ground may therefore be accelerated or retarded without altering the speed at which the engine 6 is running.

This is of great value, for in this manner the engine speed can be maintained practically at that value at which the efficiency of the engine is highest and the tractor can be driven uphill or over uneven ground at a slow rate of speed of travel. The adhesion of the tractor wheels 156—157 to the surface of the ground is augmented by the provision of the track member 159, which is kept permanently taut owing to the balancing of the pulley 143.

It will also be seen that contrary to the known construction of disc plows and disc harrows the rotation of the discs with respect to the soil is not due to the travel of the implement over the ground, induced by the friction of these elements with the ground surface, but all of the elements are driven positively by a power which also serves for advancing the entire implement over the ground.

The seeding attachment for the tractor comprises an elongated grain receptacle 168, supported on the yoke 66, by the bands 169, and disposed parallel with the harrow gang. The feeding mechanism is of the well known construction not illustrated, and the latter is mounted on a transverse shaft 170, which carries on the outer end a sprocket 171. A similar sprocket 172 is mounted on the outer end of the gang disc shaft 65 and a chain 173, is trained over the sprocket 171—172, whereby, upon revolution of sprocket 172, the feeding mechanism within the receptacle 168 is actuated, to deposit a predetermined quantity of grain or seed into a series of flexible conduits 174. These conduits 174 are associated with a series of metal disc scrapers 175, and have their lower ends projecting through the hollow tubular portions 176 thereof.

The scrapers 175 are riveted if desired to the ends of the conduits 174 and the grain passes through the conduits 174, into the furrows made by said discs. It will be perceived that the seeding mechanism is in operation as long as the disc shaft 65 revolves.

The plow disc gang may be elevated for the adjustment of the entire gang to hold same at a prescribed elevation for deep or shallow plowing and for emergency elevation to avoid obstructions encountered in the path of travel of the tractor, and such means comprises a bar 177, extending parallel with, and being secured in offsets 178, on beam 5 of the main frame of the machine. One end of bar 177 is bent at substantially right angles to form the lever 179, which is bifurcated at 180 and a vertical rod 181 is loosely mounted in a collar 182 disposed within the bifurcated portion of said lever 179, and which is pinned thereto.

The lower end of the vertical rod 181, is pivotally mounted on a pin 183, secured to one of the frame bars 58 carrying the plow gang discs 60, and the swinging frame and gang discs 60, are held in adjusted position through the intermeshing of the screw threads 184 on upper ends of the rod 181 and on the interior of a collar 182'. Such adjustment is accomplished by means of a hand wheel 185, carried by collar 182' on the upper end of rod 181 and upon the manipulation of said wheel from left to right or vice versa the rod 181 is raised or lowered and the plow gang discs are regulated with respect to their bearing or plowing action upon the surface of the soil to be plowed.

The opposite end of bar 177 carries a shifting lever 186 and a segmental quadrant 187, and a latch mechanism 188, is pivotally mounted on the lever and is operable through a tripping rod 189 and hand lever 190, to engage the latch 188 with the teeth 191 of the quadrant 187.

The plow gang frame and discs are elevated in this manner when obstructions are encountered and the lever 186 is, like the other adjusting levers, positioned within easy reach of the seat 36 for the operator of the tractor.

The plow gang frame as will be perceived, is adjustable by the hand wheel 185, and when the tractor is to be used for road work or grading, the frame can be set at the angle desired for the grade or pitch of the road, or the main frame of the tractor may be elevated at the front by revolving the wheel 51, which will actuate the elevating mechanism of the steering colter 26.

It is also obvious that the machine while here described as a self propelled agricultural implement cannot only be used as such, but by properly suspending, for instance, the plow shaft, the implement may also be used as a rotary harrow or pulverizer or may be used as a seed drill to distribute properly the seed into furrows. It is obvious also that owing to the combination of the various tools and to the fact that these tools are not frictionally driven through the travel of the implement over the ground, but are adapted to be positively driven. The machine may also be used as a ditcher and road grader, while the close juxtaposition of the harrow discs may adapt the machine to operate as a packer, and finally that upon removal of the discs, the implement can travel over the ground and can be used as a tractor for pulling other implements.

The device described and illustrated, is capable of various changes and modifications which will not depart from the scope of the present invention and which will be fully covered in the appended claims.

What I claim is as follows:

1. A self propelled agricultural implement comprising a frame, rotary plow and rotary harrow elements adjustably mounted on said frame, propelling mechanism for said implement, actuating mechanism for the plow and harrow elements, means for flexibly suspending the said frame and means for actuating the rotary plow and rotary harrow mechanisms.

2. A self propelled agricultural implement comprising a main frame, an auxiliary frame carried by said frame, a rotary harrow element mounted on the main frame, a rotary plow element mounted on the auxiliary frame, means for flexibly suspending the main frame, means for operating the propelling mechanism, and means for actutating the plow and harrow elements.

3. A self propelled agricultural implement comprising a main frame, propelling mechanism mounted on said frame, a frame pivotally mounted on the main frame, a rotary harrow element mounted on the main frame, a rotary plow element mounted on the second frame, means for suspending the main frame, means for actuating the plow and harrow elements and means for adjusting the said elements with respect to the main frames.

4. A self propelled implement comprising substantially a triangular frame, an auxiliary frame pivotally mounted on said frame, a rotary plow disc gang carried by the auxiliary frame, a rotary harrow disc gang carried by the first frame, flexible suspension means for the triangular frame, propulsion means for the implement, means for actuating the rotary plow and harrow elements, means for adjusting the implement at the points of suspension and means for adjusting the auxiliary frame to raise and lower the plow disc gang.

5. A self propelled implement comprising a main frame, an auxiliary frame pivotally mounted on the main frame, a rotary harrow disc gang mounted on the main frame and forming a point of suspension therefor, propulsion mechanism arranged on said frame and forming another point of suspension, a rotary plow disc gang carried on the auxiliary frame, a steering element mounted on the main frame and forming a further point of suspension therefor, means for propelling the implement, means for actuating the plow and harrow disc gangs, means for disposing the plow disc gang at an angle to the direction of travel of the implement, means for elevating the main frame, and means for adjusting the position of the plow gang discs.

6. A self propelled implement comprising a supporting frame, propulsion mechanism mounted on the said frame, an auxiliary frame pivotally mounted on said frame, a rotary plow disc gang carried by the auxiliary frame, a rotary harrow disc gang mounted on said supporting frame, means for adjusting the harrow and plow disc gangs, means for operating the propulsion mechanism and plow and harrow disc gangs, and means for elevating and lowering the said frame.

7. A self propelled implement comprising a supporting frame, an auxiliary frame pivotally mounted on said frame, a rotary harrow disc gang mounted on the supporting frame, a rotary plow disc gang mounted on the auxiliary frame, means for propelling the said implement, means for actuating the rotary harrow and plow disc gangs, means for elevating and lowering the supporting frame and means for elevating and lowering the auxiliary frame.

8. An agricultural implement comprising a supporting frame, a gang of harrow discs revolubly mounted on said frame, an auxiliary frame connected with said supporting frame, a gang of plow discs revolubly mounted on said auxiliary frame, ground contact mechanism mounted on the supporting frame for propelling the implement, means for actuating the plow, harrow and propelling mechanism and means for varying the speeds of the said mechanisms.

9. An agricultural implement, the combination with a supporting frame, of a gang of rotatable harrow discs adjustably mounted on said frame, an auxiliary frame pivotally mounted on said frame, a gang of rotatable plow discs carried by said auxiliary frame, means for suspending the supporting frame, means for adjusting the suspension means, and means for adjusting the auxiliary frame.

10. A self propelled agricultural implement, the combination with a main frame, of propelling mechanism mounted on said frame, an auxiliary frame pivotally mounted on the main frame, a rotatable gang of plow discs mounted thereon, a rotatable gang of harrow discs carried by the main frame, suspension means for the frame and disc gangs and means for adjusting the same.

11. In an agricultural implement, a frame, a rotary plow disk gang carried by the frame, a rotary harrow disk gang carried by the frame, and means for driving said plow disk and harrow disk gangs at variable speeds, said plow disk and harrow disk gangs being arranged to compensate the side pull of each other.

12. A self-propelled implement, comprising a main frame, an auxiliary frame pivotally mounted on the main frame, a rotary harrow disk gang mounted on the main frame and forming a point of suspension thereof, propulsion mechanism arranged on said frame and forming another point of suspension a rotary plow disk gang carried on the auxiliary frame, a steering element mounted on the main frame and forming a further point of suspension therefor, a shoe combined with said steering element, means for propelling the implement, means for actuating the plow and harrow disk gangs, means for elevating the main frame, and means for adjusting the position of the plow disk gang.

13. A self-propelled element, comprising a triangular main frame, an auxiliary frame pivotally mounted on the main frame, a rotary harrow disk gang mounted on the main frame and forming a point of suspension for the frame at one corner thereof, an under-slung adjusting leveling device for the harrow disk gang, propulsion mechanism arranged on said frame and forming another point of suspension at another corner of the frame, a rotary plow disk gang carried on the auxiliary frame, a steering element mounted on the main frame and forming a point of suspension therefor at the third corner, means for controlling the element, means for actuating the plow and harrow disk gangs, means for elevating the main frame, and means for adjusting the position of the plow disk gang.

14. An agricultural implement of the character described, comprising in combination a substantially triangular frame with a relatively narrow base, a steering device supporting the corner of the frame opposite the base, a soil-tilling device supporting the triangular frame near its base and extending approximately in direction of the base, and a propelling device adjacent to the base and adapted to form a support for the triangular frame.

In testimony whereof I affix my signature in the presence of two witnesses.

ALBERT HINDLEY ANDERSON.

Witnesses:
   DANIEL A. BRENNAN,
   IRMA BECK.